UNITED STATES PATENT OFFICE.

WATERS SMITH DAVIS, JR., OF GALVESTON, TEXAS, ASSIGNOR TO SEABOARD RICE MILLING CO., OF GALVESTON, TEXAS.

PROCESS OF STERILIZING AND PACKAGING RICE.

1,094,197.   Specification of Letters Patent.   Patented Apr. 21, 1914.

No Drawing.   Application filed April 23, 1913.   Serial No. 763,167.

*To all whom it may concern:*

Be it known that I, WATERS SMITH DAVIS, Jr., a citizen of the United States, and a resident of Galveston, in the county of Galveston and State of Texas, have invented an Improved Process of Sterilizing and Packaging Rice, of which the following is a specification.

Sterilization of hulled or cleaned rice is practised with the view of protecting it from attack by the weevil or other insects and for improving its keeping quality and also its edibility; but this process has proven ineffective to a great degree owing to the cracking and breaking of the rice, which result I have found to be chiefly due to contact of cool air with the rice after heating and before inclosing and sealing it in the cartons or other form of package. I have discovered and practised a process by which this undesirable result is avoided, the rice being sterilized and packed under the exclusion of cool air, whereby cracking and breaking of the kernels are almost completely prevented and a superior article of food is furnished to the consumer.

The rice is fed slowly into a heater, say a revolving drier, which is kept at a temperature of 138° F. to 140° F., it being constantly rolled or moved about therein so that it cannot become overheated or burned. The rice is fed in slowly, since it has been found necessary that it shall be warmed gradually to the required temperature. This operation is continued from twenty to thirty minutes, after which the heated and now sterilized rice passes out of the drier at its delivery end and discharges upon a shaker by whose operation imperfect kernals are removed. From the shaker the selected kernels drop into a covered bin, from which they go direct to the packing machine through covered spouts and into the cartons where they are sealed up while still hot.

The shaker, the bin, the packaging machine, and the cartons are covered and protected, preferably by sheet metal hood or hoods, so that fresh or cool air is prevented from access to the heated rice from the point of its discharge from the drier to its delivery and sealing in the package, whereby cracking and breaking are effectually avoided.

I claim:—

1. The process of sterilizing and packaging rice, which consists in gradually subjecting it to a sterilizing heat and maintaining the maximum degree of heat for twenty minutes or more; then delivering the sterilized and still hot rice to a shaker whose operation removes imperfect kernels; then discharging the selected kernels into a receiver from which they are in turn delivered and conveyed into cartons or other form of packages, and sealed therein while still hot, these several operations being effected under the exclusion of fresh or cool air, as described.

2. The improved process of sterilizing and packaging rice, which consists in subjecting it to a heat sufficient to sterilize it, then conveying the still hot rice to a receiver, and then delivering it into cartons or other form of package and immediately sealing the latter, fresh or cool air being prevented from access to the rice from the beginning to the end of the described operation, as specified.

WATERS SMITH DAVIS, JR.

Witnesses:
CECIL CHAMBERS,
WM. M. SELKIRK.